United States Patent
Tirumala et al.

(10) Patent No.: US 10,560,013 B2
(45) Date of Patent: Feb. 11, 2020

(54) METHOD AND APPARATUS FOR REDUCING OUTPUT VOLTAGE RIPPLE IN HYSTERETIC BOOST OR BUCK-BOOST CONVERTER

(71) Applicant: Microchip Technology Incorporated, Chandler, AZ (US)

(72) Inventors: Rohit Tirumala, Sunnyvale, CA (US); Tommy Ho, Sham Shui Po (HK); Fu-ho Lee, San Ramon, CA (US); Miguel A. Salcedo, Watsonville, CA (US)

(73) Assignee: Microchip Technology Incorporated, Chandler, AZ (US)

(*) Notice: Subject to any disclaimer, the term of this patent is extended or adjusted under 35 U.S.C. 154(b) by 0 days.

(21) Appl. No.: 16/236,507

(22) Filed: Dec. 30, 2018

(65) Prior Publication Data

US 2019/0222110 A1    Jul. 18, 2019

Related U.S. Application Data

(60) Provisional application No. 62/617,931, filed on Jan. 16, 2018.

(51) Int. Cl.
| | |
|---|---|
| *G06F 1/00* | (2006.01) |
| *H02M 1/14* | (2006.01) |
| *H02M 1/08* | (2006.01) |
| *H02M 3/156* | (2006.01) |

(52) U.S. Cl.
CPC .............. *H02M 1/14* (2013.01); *H02M 1/08* (2013.01); *H02M 3/156* (2013.01)

(58) Field of Classification Search
CPC .......... H02M 1/14; H02M 1/08; H02M 3/156; H02M 2001/0041; H02M 2001/0025; H02H 2001/0096
USPC .................. 323/222, 224, 235, 282–290
See application file for complete search history.

(56) References Cited

U.S. PATENT DOCUMENTS

| | | | |
|---|---|---|---|
| 6,912,144 B1 * | 6/2005 | Clavette | H02M 3/1584 323/283 |
| 7,030,596 B1 * | 4/2006 | Salerno | H02M 3/158 323/282 |
| 7,161,332 B1 * | 1/2007 | Kleine | H02M 3/1584 323/222 |
| 8,193,798 B1 * | 6/2012 | Pace | H02M 3/156 323/284 |
| 8,829,872 B1 * | 9/2014 | Pierson | H02M 1/14 323/272 |
| 2007/0001655 A1 | 1/2007 | Schiff | |

(Continued)

*Primary Examiner* — Rajnikant B Patel
(74) *Attorney, Agent, or Firm* — Burr & Forman LLP; Ryan M. Corbett

(57) ABSTRACT

An apparatus and method for reducing an output voltage ripple of a converter are provided. The apparatus may include a controller for controlling a converter, wherein the controller may include a clock generating circuit that generates a periodic clock signal containing periodic clock pulses, and a control circuit that causes the clock generating circuit to asynchronously initiate a clock pulse based on a difference between a feedback voltage of the converter and a reference voltage. The apparatus may also include an on-time modulation circuit which modulates the on-time based on the difference between the reference voltage and the sampled output voltage.

17 Claims, 5 Drawing Sheets

(56) References Cited

U.S. PATENT DOCUMENTS

2007/0013350 A1\* 1/2007 Tang .................. H02M 3/1584
                                                  323/237
2009/0302817 A1   12/2009 Nagai
2012/0286750 A1   11/2012 Xu
2014/0070784 A1\* 3/2014 Lynch ................. H02M 3/156
                                                  323/283

\* cited by examiner

Sample and Hold at Full Load

Sample and Hold at Light Load

METHOD AND APPARATUS FOR REDUCING OUTPUT VOLTAGE RIPPLE IN HYSTERETIC BOOST OR BUCK-BOOST CONVERTER

CROSS-REFERENCE TO RELATED APPLICATION

This application claims the benefit of U.S. Provisional Patent Application No. 62/617,931, filed on Jan. 16, 2018, which is incorporated by reference in its entirety.

TECHNICAL FIELD

The present application generally relates to controllers for boost, buck-boost or flyback converters, and more specifically to reducing the output voltage ripple in hysteretic boost or buck-boost converters.

SUMMARY

Boost or buck-boost hysteretic converters, and more particularly discontinuous conduction mode or boundary conduction mode boost or buck-boost hysteretic converters, are commonly used for low power applications, and have a relatively simple design. These converters commonly include a switch, such as a switching field effect transistor (FET), an inductor, a diode, and an output capacitor. When the FET is on, the inductor is charging, and no power is being delivered to the output. During this state, the output capacitor is discharged. When the FET turns off, the diode turns on, and the energy in the inductor is discharged to charge the output capacitor.

The converter is commonly designed to operate at a fixed duty cycle and a fixed frequency, and monitors the output voltage. The FET is controlled by a clock pulse, and turns the FET on based upon the monitored output voltage. In particular, the rising edge of the clock pulse represents a decision point, at which it is determined whether to initiate the next pulse to turn on the FET by comparing the output voltage to a fixed reference voltage. If the output voltage is less than the fixed reference voltage, the next switching pulse is initiated at the fixed duty cycle and frequency. However, if the output voltage is greater than the reference voltage, the pulse is not initiated. The resulting output voltage includes an undesirable ripple that varies depending on the load, and the variation in the ripple may become fairly large when the output capacitor is fairly small.

In particular, FIG. 1 shows the waveforms of a boost (or buck-boost) converter, implemented with a controller such as the Microchip® HV9150, when it is operated at full load. As shown in FIG. 1, when the gate of the switching FET is high (voltage GT, shown in waveform 101, is high), the output voltage Vo is actually ramping down, as shown in waveform 102. As indicated above, for a boost (or buck-boost) converter, when the switching FET is ON, the inductor is charging and no power is being delivered to the output, and the output capacitor is being discharged. When the switching FET turns off, the diode turns on, and the energy in the inductor is supplied to the output capacitor and the load.

In operation, as indicated above, the rising edge of each gate pulse (GT) is a decision point at which the output voltage Vo is compared to a reference voltage, REF. If the output voltage Vo is less than the reference voltage REF, the next gate pulse is initiated, as shown in the first three gate pulses (GT) in FIG. 1. However, if the output voltage Vo exceeds the reference voltage REF at the decision point, the next gate pulse to charge the inductor is not initiated. As shown in FIG. 1, the fourth gate pulse 103 (shown in dotted lines) is skipped because at the time the fourth gate pulse would be initiated (decision point), the output voltage Vo exceeds the reference voltage REF. As also shown in FIG. 1, because the gate pulse has a fixed frequency, the next gate pulse is initiated in accordance with the fixed frequency, even though the output voltage falls below the reference voltage REF before the initiation of the next gate pulse. In other words, there is a delay $t_{d1}$ from the time the output voltage Vo becomes less than the reference voltage REF until the next gate pulse is initiated. There is also a further delay $t_{d2}$ from the initiation of the pulse to the time the boost diode begins conducting, and supplying energy to the output capacitor and load. The delay $t_{d2}$ is a fixed delay that equals the programmed on-time of the switch. Delay $t_{d1}$ is variable based on the loading condition, and can be any number from zero to one switching cycle.

Synchronizing the gate pulse to the output of the comparator (i.e. resetting the clock when the output voltage Vo drops below the reference voltage REF) can help in either eliminating the delay $t_{d1}$ entirely or making $t_{d1}$ a fixed delay which would eliminate the variability. This will help reduce the ripple significantly (typical numbers are about 40-50% reduction in the output ripple at full load). According to one or more exemplary embodiments, there is provided a controller for controlling a converter, wherein the controller may include a clock generating circuit that generates a periodic clock signal containing periodic clock pulses, and a control circuit that causes the clock generating circuit to asynchronously initiate a clock pulse based on a difference between a feedback voltage of the converter and a reference voltage. The asynchronously-initiated clock pulse may be configured to activate a switch of the converter.

The control circuit may cause the clock generating circuit to asynchronously initiate the clock pulse based on a determination that the feedback voltage is less than the reference voltage.

In one or more exemplary embodiments, the clock generating circuit may include a current source coupled to a capacitor. The control circuit may include a pull-up circuit that pulls up the voltage of the capacitor when the feedback voltage is less than the reference voltage, to cause the clock generating circuit to asynchronously initiate a clock pulse.

The controller may also include a pulse width modulation circuit that modulates the width of the asynchronously-initiated clock pulse based on a difference between the feedback voltage and the reference voltage. The pulse width modulation circuit may include a sample and hold circuit that samples the feedback voltage, and a comparator that compares the sampled feedback voltage to the reference voltage. As compared to using a fixed pulse width, modulating the pulse width may help in reducing output voltage ripple.

The pulse width modulation circuit may linearly reduce the width of the asynchronously-initiated clock pulse if the sampled feedback voltage is greater than the reference voltage, or a fraction of the reference voltage. The pulse width modulation circuit may control the width of the asynchronously-initiated clock pulse corresponding to a maximum on-time if the sampled feedback voltage is less than the reference voltage.

According to an aspect of one or more exemplary embodiments, there may also be provided a method of controlling an output voltage ripple of a converter. The method may include generating a periodic clock signal containing periodic clock pulses, determining a difference between a feedback voltage of the converter and a reference voltage, and asynchronously initiating a clock pulse based on the difference between the feedback voltage of the converter and the reference voltage. The method may also include activating a switch of the converter using the asynchronously-initiated clock pulse.

The asynchronous clock pulse may be initiated if the feedback voltage is determined to be less than the reference voltage. The step of asynchronously initiating a clock pulse may include using a pull-up circuit to asynchronously initiate the clock pulse when the feedback voltage is less than the reference voltage.

The method according to one or more exemplary embodiments may include modulating the width of the asynchronously-initiated clock pulse based on a difference between the feedback voltage and the reference voltage. The step of modulating the width of the clock pulses may include reducing the width of the asynchronously-initiated clock pulse as the feedback voltage approaches the reference voltage. The method may also include sampling the feedback voltage and comparing the sampled feedback voltage to the reference voltage. The step of modulating the width of the asynchronously-initiated clock pulse may include linearly reducing the width of the asynchronously-initiated clock pulse if the sampled feedback voltage is greater than the reference voltage, or a fraction of the reference voltage. The step of modulating the width of the asynchronously-initiated clock pulses may include controlling the width of the asynchronously-initiated clock pulse corresponding to a maximum on-time if the sampled feedback voltage is less than the reference voltage.

DETAILED DESCRIPTION OF EXEMPLARY EMBODIMENTS

Figure 1:
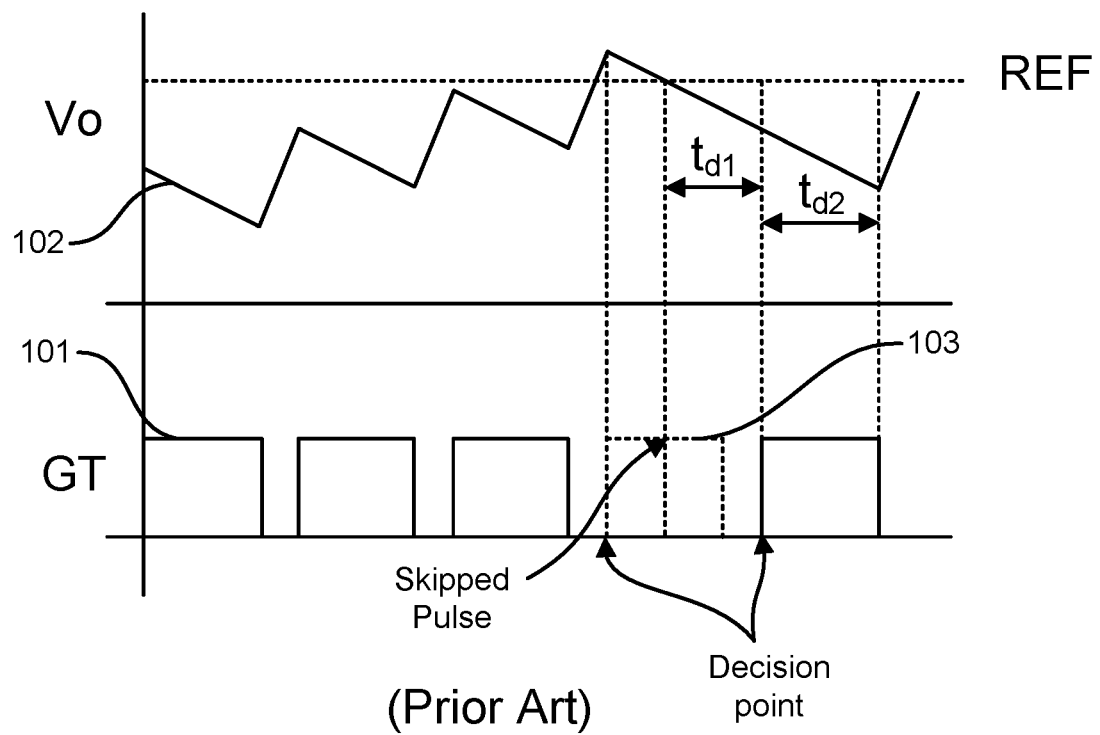
FIG. 1 illustrates voltage waveforms of a boost or buck-boost converter according to the prior art.

Reference will now be made in detail to the following exemplary embodiments, which are illustrated in the accompanying drawings, wherein like reference numerals refer to like elements throughout. The exemplary embodiments may be embodied in various forms without being limited to the exemplary embodiments set forth herein. Descriptions of well-known parts are omitted for clarity.

Figure 2:
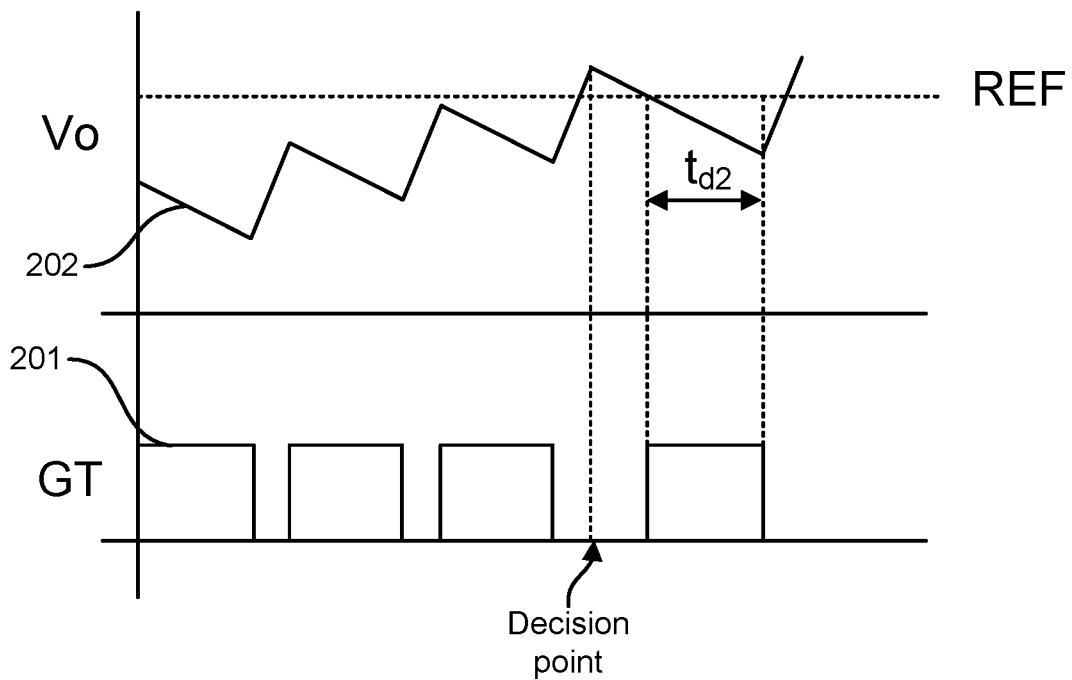
FIG. 2 illustrates voltage waveforms of a boost or buck-boost converter controlled by a controller circuit according to an exemplary embodiment.

FIG. 2 shows the effect of synchronizing the clock to the output of the comparator according to one or more exemplary embodiments. By synchronizing the gate pulse to the output of the comparator (i.e. resetting the clock when the output voltage Vo drops below the reference voltage REF) the delay $t_{d1}$ may be eliminated entirely or the delay $t_{d1}$ may become fixed, which would eliminate the variability. This will help reduce the ripple significantly (typical numbers are about 40-50% reduction in the output ripple at full load). Note that the waveforms shown are not entirely in steady-state (for both FIGS. 1 and 2), but they show the ripple reduction with reasonable accuracy. As shown in FIG. 2, the fourth gate pulse of the gate voltage waveform 201 is initiated when the output voltage Vo, shown in waveform 202, is equal to the reference voltage Vo, instead of waiting for the next pulse to initiate based on the fixed frequency. In other words, the decision point at which the converter compares the output voltage to the reference voltage to decide whether to initiate the next cycle or skip it, has changed as compared to FIG. 1. In FIG. 1, the decision point is based on the fixed duty cycle, and corresponds to the time at which the next rising edge of pulse would occur, regardless of whether the output voltage is less than the reference voltage. By contrast, in FIG. 2, the decision point is not fixed, and instead corresponds to the time at which the output voltage falls below the reference voltage. As a result, the delay $t_{d1}$ is eliminated, and the amount of ripple in the output voltage Vo is also reduced.

Figure 3:
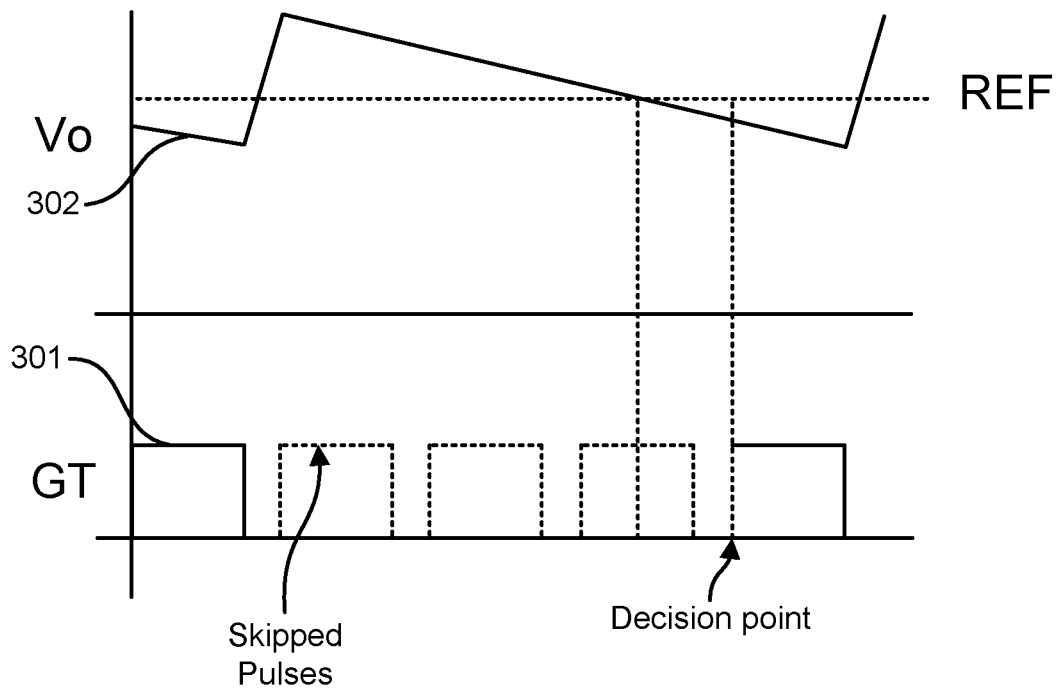
FIG. 3 illustrates voltage waveforms of a boost or buck-boost converter controlled by a controller circuit at light load according to the prior art.

FIG. 3 shows the operation of the converter for a light load case according to the prior art. In this case, the delay times $t_{d1}$ and $t_{d2}$ do not play a significant role since the rate of fall of the output voltage is very small (because it is lightly loaded). The main cause of the ripple is the amount of energy that is pumped into the capacitor. When the output is lightly loaded, the output voltage Vo, shown in waveform 302, does not fall much below the reference voltage REF when the next pulse of the gate voltage GT, shown in waveform 301, is initiated. At this point, the pre-programmed duty pulse of the gate voltage GT is initiated, which causes the output voltage Vo to overshoot significantly beyond the reference voltage REF.

Figure 4:
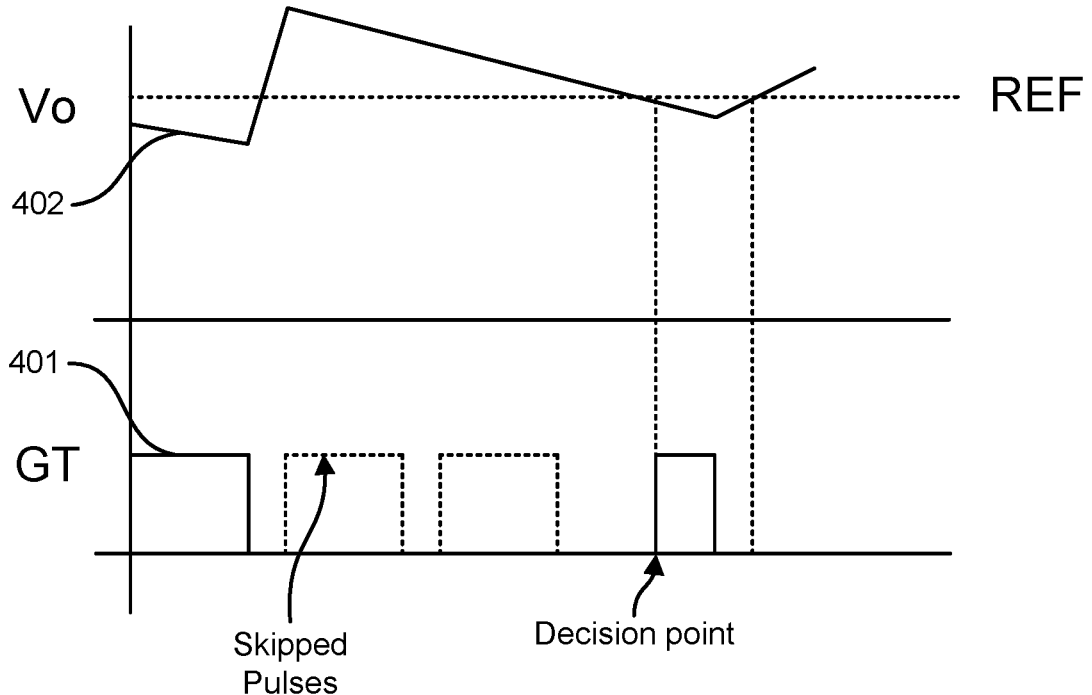
FIG. 4 illustrates voltage waveforms of a boost or buck-boost converter controlled by a controller circuit at light load according to an exemplary embodiment.

This effect can be mitigated by reducing the pulse width internally to a fraction of the pre-programmed pulse width. The decision on the amount of reduction required may be made based on the measurement of the overshoot of a previous cycle. To measure the overshoot of the output voltage during the previous cycle, the output voltage is sampled at a sample time. The sample time may be optimized to measure as close to the peak output voltage as possible. FIG. 4 shows the effect of reducing the on-time during light load operation, thus reducing the amount of energy to supplied to the output capacitor and load during the off-time, according to one or more exemplary embodiments. As shown in FIG. 4, the duty cycle of the gate pulse (waveform 401) is reduced, which reduces the amount by which the output voltage Vo (waveform 402) overshoots the reference voltage REF after the gate pulse is reinitiated.

Figure 5A:
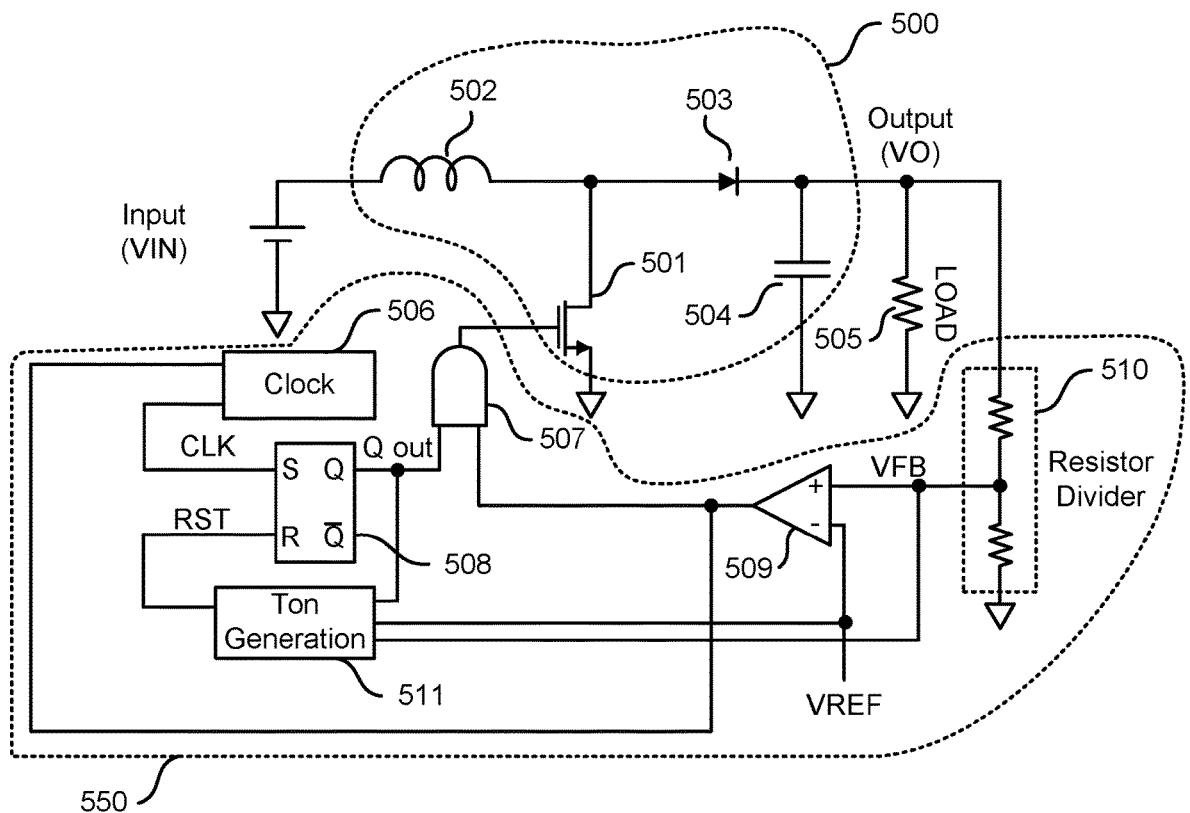
FIG. 5A illustrates a converter and a control circuit for controlling the converter according to an exemplary embodiment

FIG. 5A shows a converter 500 and a control circuit 550 for controlling the converter 500 according to an exemplary embodiment. Referring to FIG. 5, the converter 500 according to the exemplary embodiment includes a switching FET 501, an inductor 502, a diode 503, and an output capacitor 504, which are used to provide energy to a load 505. As explained above, when the FET 501 is turned on, the inductor 502 charges, and no power is being delivered to the output capacitor 504. During this state, the output capacitor 504 is discharged providing energy to the load 505. When the FET 501 turns off, the diode 503 turns on, and the energy in the inductor 502 is discharged to charge the output capacitor 504.

The control circuit 550 of the exemplary embodiment of FIG. 5 controls the switching of the FET 501, and may include an internal clock 506 that generates a clock signal CLK that is output to one input of an AND gate 507 via a flip-flop 508. The other input of the AND gate 507 receives the output of a comparator 509 comparing a feedback voltage VFB to a reference voltage VREF. According to one or more exemplary embodiments, the feedback voltage VFB may represent the output voltage Vo after it is divided by a resistor divider 510. When the feedback voltage VFB falls below the reference voltage VREF, the output of the comparator 509 goes high, which causes the AND gate 507 to pass the Q output ($Q_{out}$) of the flip-flop 508, which may represent the clock signal CLK to the switching FET 501, and turns on the switching FET 501. The exemplary control circuit 550 may also include a pulse width modulation circuit 511 that may control the length of time that the switching FET 501 is turned on. For example, the pulse width modulation circuit 511 may output a reset signal RST to a reset input of flip-flop 508. According to an exemplary embodiment, when the reset signal RST goes high, the output of the flip-flop 508 becomes low, which turns off the switching FET 501. Accordingly, the width of the gate signal applied to switching FET 501 may be controlled, as will be explained below in more detail with respect to FIG. 8.

Figure 5B:
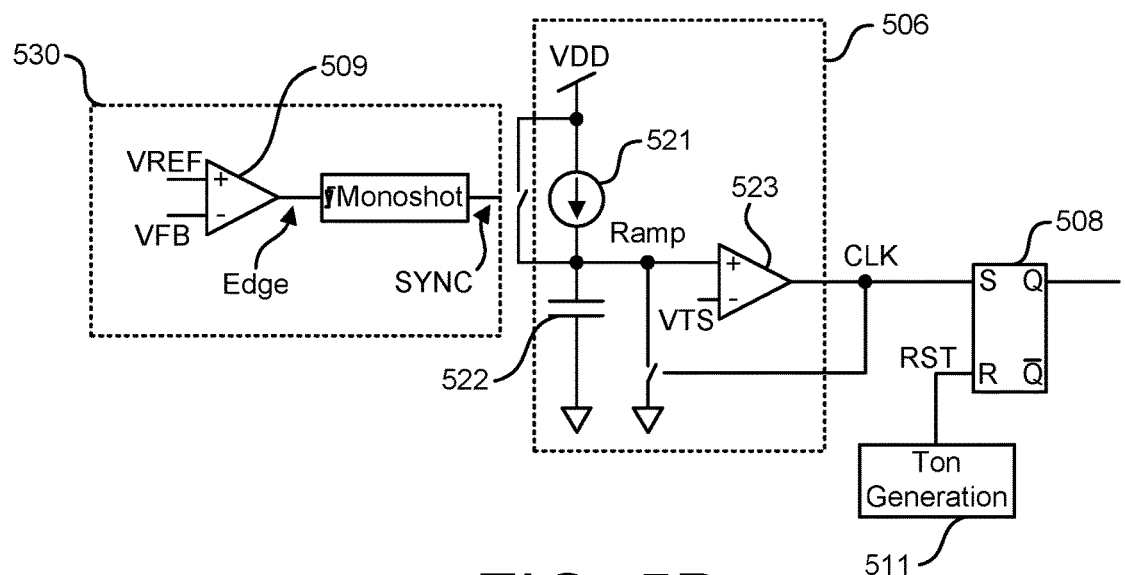
FIG. 5B illustrates an exemplary embodiment of the clock circuit of FIG. 5.

FIG. 5B shows an exemplary embodiment of the clock 506 shown in FIG. 5A, which may synchronize the gate pulse to the output of the comparator 509 that compares the feedback voltage VFB to the reference voltage REF. In this configuration, the gate pulse signal of the FET 501 is synchronized to the output of the comparator 509, such that the gate signal goes high when the feedback voltage VFB falls below the reference voltage VREF. Synchronizing the clock in this manner may reduce the output voltage ripple at higher load conditions.

More specifically, as shown in FIG. 5B, the internal clock signal Ramp is generated by a current source 521 into a capacitor 522. The current source 521 may be programmed by an external resistor (not shown). The internal clock signal Ramp is re-set to zero when the voltage across the capacitor 522 reaches an internal fixed voltage VTS. In particular, a comparator 523 receives the internal clock signal Ramp at one input, and receives the internal fixed voltage VTS at the other input. The comparator 523 outputs a positive clock signal CLK when the internal clock signal Ramp is greater than the internal fixed voltage VTS. A pulse of the clock signal CLK to turn on the FET 501 of the boost or buck-boost converter is initiated at this point via a set input of flip-flop 508, which pulse of the clock signal CLK also closes a switch discharging the capacitor 522 thus resetting the internal clock signal Ramp.

In order to synchronize the clock signal CLK to the feedback voltage VFB, the exemplary embodiment of FIG. 5B may include a pull-up circuit 530, which may pull up the voltage of capacitor 522 to VDD (or a value greater than VTS) when the feedback voltage VFB falls below the reference voltage VREF. For example, the comparator 509 may receive the feedback voltage VFB and reference voltage VREF as inputs, and output a signal SYNC that causes a switch to close, thereby connecting the capacitor 522 to VDD. Thus, when the feedback voltage VFB falls below the reference voltage VREF, the clock signal CLK goes high without waiting for the next pulse to be initiated based on the fixed frequency.

In addition to synchronizing the clock signal CLK to the output of the comparator 509, one or more exemplary embodiments may also modulate the width of the gate pulses, or on-time of the FET 501, based on the difference between the feedback voltage VFB and the reference voltage VREF. Under light load operation, this may reduce the amount by which the output voltage Vo overshoots the reference voltage. To accomplish this, although the maximum on-time ($Ton_{max}$) is programmed by the user, the actual on-time Ton may be determined based on the sampled feedback voltage, as explained below with reference to FIG. 8. For example, if the sampled feedback voltage $VFB_{SH}$ is less than K1 multiplied by the reference voltage VREF (where K1 is a number between zero and one), the on-time Ton is equal to the maximum on-time $Ton_{max}$. If the sampled feedback voltage $VFB_{SH}$ is greater than K1 multiplied by the reference voltage VREF, then the on-time Ton may be calculated according to equation (1):

$$Ton=Ton_{max}-K*(VFB_{SH}-VFB);\qquad\text{(Equation 1)}$$

where VFB is the feedback voltage, $VFB_{SH}$ is the sampled and held feedback voltage, K is a constant, and $Ton_{max}$ is the maximum on-time. Although Equation 1 illustrates a linear reduction in Ton based on the measured feedback voltage, this is merely an exemplary embodiment, and the on-time Ton may be reduced inter-alia quadratically or exponentially with respect to the measured feedback voltage.

Figure 6:
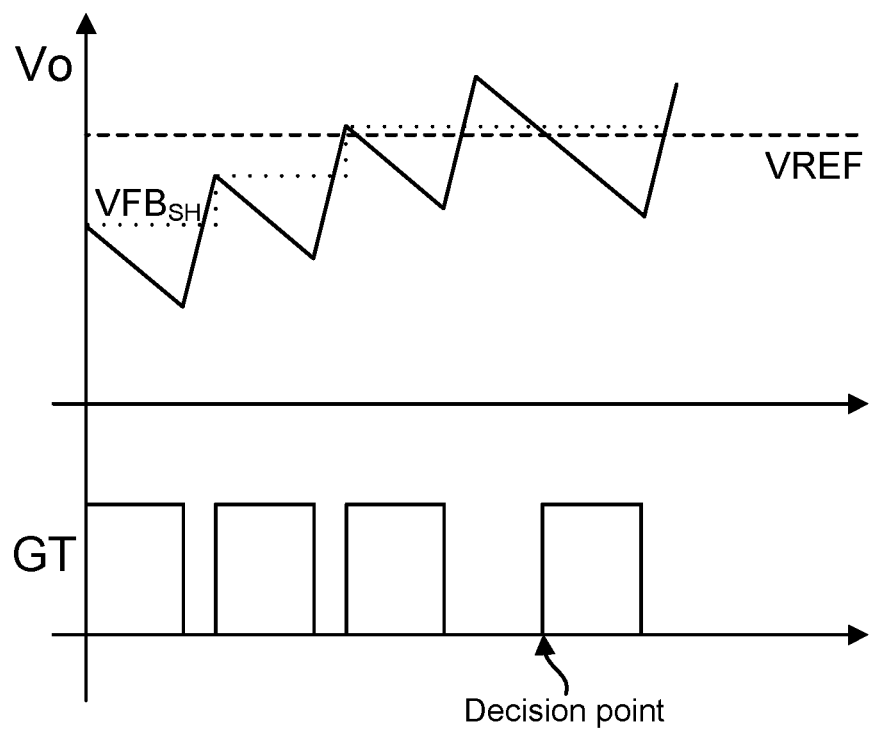
FIG. 6 illustrates voltage waveforms of a boost or buck-boost converter with on-time modulation at full load according to an exemplary embodiment.
Figure 7:
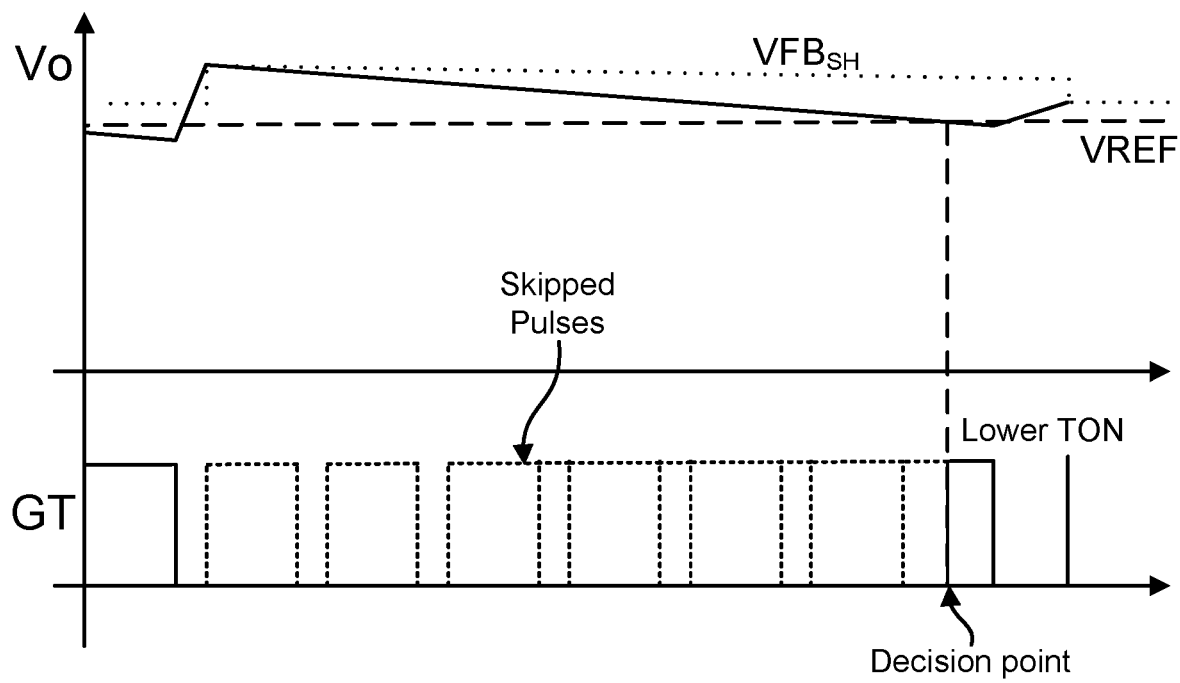
FIG. 7 illustrates voltage waveforms of a boost or buck-boost converter controlled with on-time modulation at light load according to an exemplary embodiment.

According to one or more exemplary embodiments, the feedback voltage VFB may be sampled just before the FET 501 turns on. Given the operation of the boost (or buck-boost) converter, this is the point in time when the full energy stored in the inductor 502 (during switch on-time) is supplied to the output capacitor 504 and the output capacitor voltage is at its maximum. FIG. 6 shows the sampling action and waveforms during maximum loading and FIG. 7 shows the same waveforms during light load conditions, according to an exemplary embodiment, where $VFB_{SH}$ is sampled and held feedback voltage.

Figure 8:
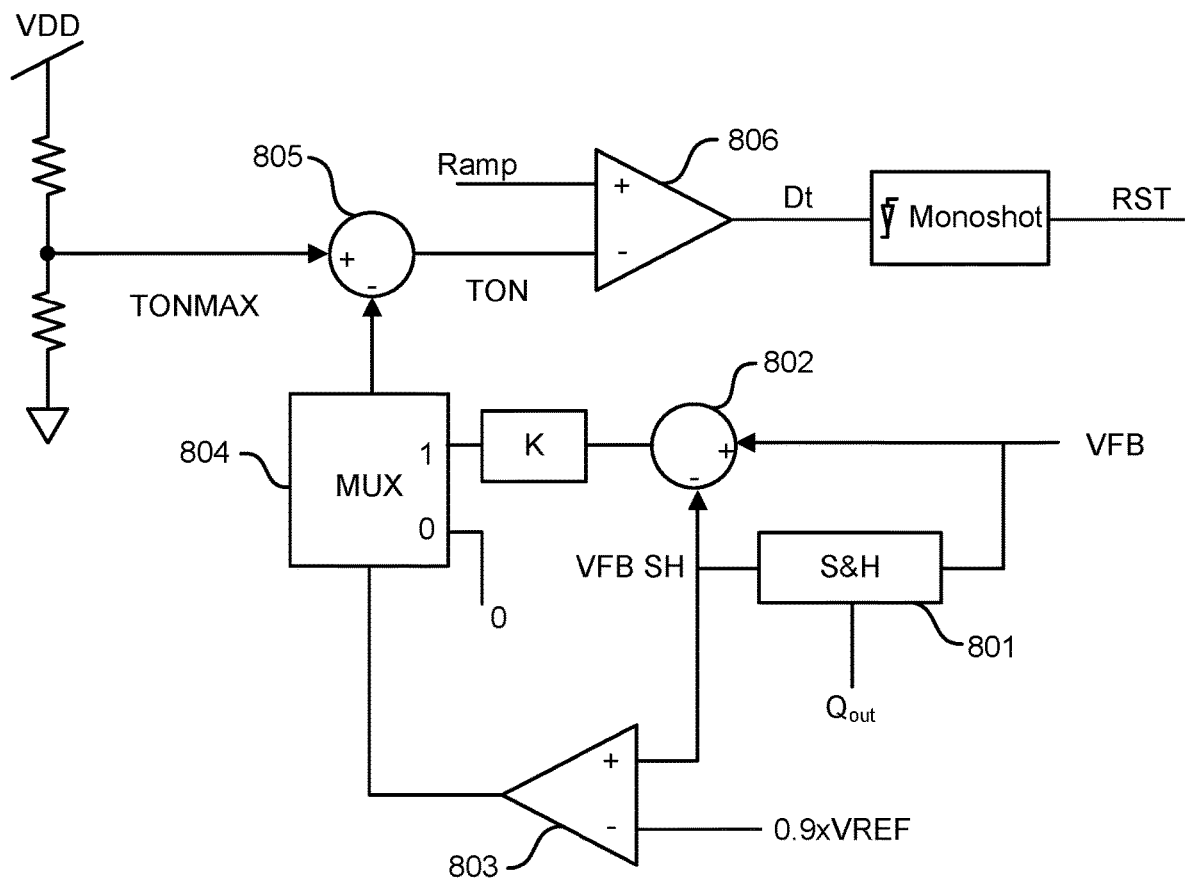
FIG. 8 illustrates an on-time modulation control circuit according to an exemplary embodiment.

FIG. 8 shows an architecture according to an exemplary embodiment to implement the above-described on-time modulation by pulse width modulation circuit 511. Referring to FIG. 8, the feedback voltage VFB is sampled and held by a sample and hold circuit 801 just before the FET 501 turns on, and outputs sampled and held feedback voltage $VFB_{SH}$. The sample and hold circuit 801 samples the feedback voltage VFB based on the Q output signal $Q_{out}$ of flip-flop 508. The feedback voltage VFB and the sampled and held feedback voltage $VFB_{SH}$ are input into a difference circuit 802, the output of which is multiplied by a constant K. The sampled and held feedback voltage $VFB_{SH}$ is also input to a comparator 803, the other input of which receives a signal that is 90% of the reference voltage VREF. Inputting 90% of the reference voltage VREF into the second input of comparator 803 is merely exemplary, and other percentages of the reference voltage VREF, including 100%, may be used. The output of the comparator 803 is supplied as the control input to a multiplexer MUX 804. If the sampled and held feedback voltage $VFB_{SH}$ is less than 90% of the reference voltage VREF, the output of the comparator 803 is low, and the multiplexer MUX 804 output is zero. If the sampled and held feedback voltage $VFB_{SH}$ is greater than 90% of the reference voltage VREF, the output of the comparator 803 is high, and the multiplexer MUX 804 outputs the difference between the sampled and held feedback voltage $VFB_{SH}$ and the feedback voltage VFB, multiplied by constant K. The output of the multiplexer MUX 804 is input to a difference circuit 805, which outputs the difference between the maximum on-time $Ton_{max}$ set by a resistor divider and the output of the multiplexer MUX 804. The output of the difference circuit 805 is the on-time signal Ton, which is input into a comparator 806, the other input of which receives internal clock Ramp. When the internal clock Ramp is greater than the on-time signal Ton, the output of the comparator Dt is high, which is fed to a monoshot, and in response the monoshot generates a signal pulse which is fed as the reset signal RST to the input of flip-flop 508. Thus, the reset signal RST is set based on the feedback voltage.

Referring back to FIG. 5, the reset signal RST causes the output of the flip-flop 508 to become low, which limits the width of gate pulse that turns on the FET 501. By limiting the on-time, the output voltage Vo remains closer to the reference voltage VREF, as shown in FIG. 7.

Although the inventive concepts of the present disclosure have been described and illustrated with respect to exemplary embodiments thereof, it is not limited to the exemplary embodiments disclosed herein and modifications may be made therein without departing from the scope of the inventive concepts.

What is claimed is:

1. A controller for a converter, the controller comprising:
a clock generating circuit that generates a periodic clock signal containing periodic clock pulses; and
a control circuit that causes the clock generating circuit to asynchronously initiate a clock pulse based on a difference between a feedback voltage of the converter and a reference voltage;
wherein the clock generating circuit comprises a current source coupled to a capacitor; and
wherein the control circuit comprises a pull-up circuit that pulls up a voltage of the capacitor when the feedback voltage is less than the reference voltage, to cause the clock generating circuit to asynchronously initiate a clock pulse.

2. The controller of claim 1, wherein the asynchronously-initiated clock pulse is configured to activate a switch of the converter.

3. The controller of claim 1, further comprising a pulse width modulation circuit that modulates the width of the asynchronously-initiated clock pulse based on a difference between the feedback voltage and the reference voltage.

4. The controller of claim 3, wherein the pulse width modulation circuit reduces the width of the asynchronously-initiated clock pulse as the feedback voltage approaches the reference voltage.

5. The controller of claim 3, wherein the pulse width modulation circuit comprises:
a sample and hold circuit that samples the feedback voltage; and
a comparator that compares the sampled feedback voltage to the reference voltage.

6. The controller of claim 5, wherein the pulse width modulation circuit linearly reduces the width of the asynchronously-initiated clock pulse if the sampled feedback voltage is greater than the reference voltage.

7. The controller of claim 5, wherein the pulse width modulation circuit linearly reduces the width of the asynchronously-initiated clock pulse if the sampled feedback voltage is greater than a predetermined fraction of the reference voltage.

8. The controller of claim 5, wherein the pulse width modulation circuit controls the width of the asynchronously-initiated clock pulse based on whether the sampled feedback voltage is less than the reference voltage.

9. A method of controlling an output voltage ripple of a converter, the method comprising:
generating a periodic clock signal containing periodic clock pulses;
determining a difference between a feedback voltage of the converter and a reference voltage; and
asynchronously initiating a clock pulse based on the difference between the feedback voltage of the converter and the reference voltage;
wherein the step of asynchronously initiating a clock pulse comprises using a pull-up circuit to asynchronously initiate the clock pulse when the feedback voltage is less than the reference voltage.

10. The method of claim 9, further comprising activating a switch of the converter using the asynchronously-initiated clock pulse.

11. The method of claim 9, further comprising modulating the width of the asynchronously-initiated clock pulse based on a difference between the feedback voltage and the reference voltage.

12. The method of claim 11, wherein the step of modulating the width of the clock pulses comprises reducing the width of the asynchronously-initiated clock pulse as the feedback voltage approaches the reference voltage.

13. The method of claim 11, further comprising:
sampling the feedback voltage; and
comparing the sampled feedback voltage to the reference voltage.

14. The method of claim 13, wherein the step of modulating the width of the asynchronously-initiated clock pulse comprises linearly reducing the width of the asynchronously-initiated clock pulse if the sampled feedback voltage is greater than the reference voltage.

15. The method of claim 13, wherein the step of modulating the width of the asynchronously-initiated clock pulse comprises linearly reducing the width of the asynchronously-initiated clock pulse if the sampled feedback voltage is greater than a fraction of the reference voltage.

16. The method of claim 13, wherein the step of modulating the width of the asynchronously-initiated clock pulses comprises controlling the width of the asynchronously-initiated clock pulse corresponding to a maximum on-time if the sampled feedback voltage is less than the reference voltage.

17. The controller of claim 1, wherein the converter is a hysteretic boost or buck-boost converter.

* * * * *